Oct. 25, 1949.  H. L. BRUMP  2,486,107
REMOTE CONTROL FOR REVERSING
RECIPROCATORY TABLE DRIVES
Filed Aug. 22, 1944  3 Sheets-Sheet 1
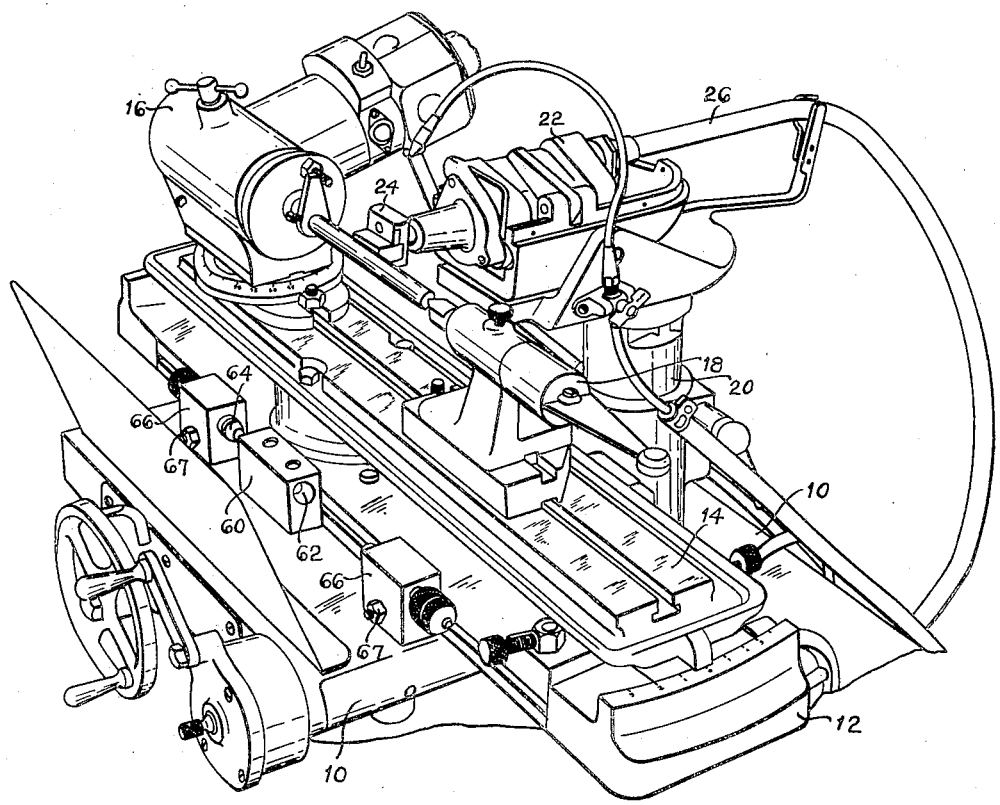
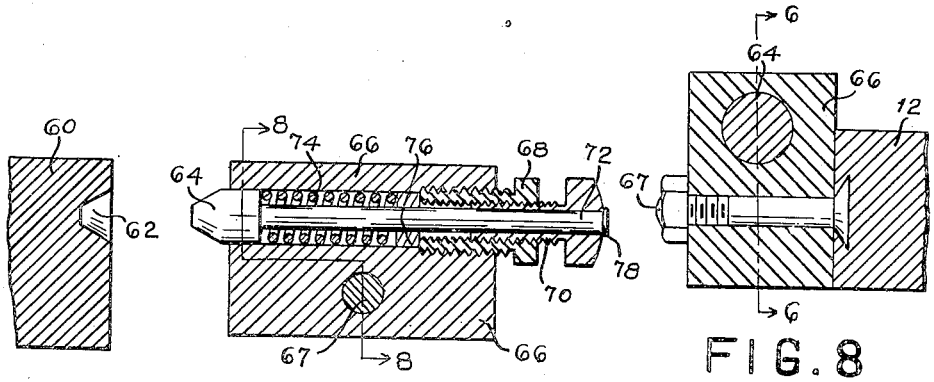
INVENTOR.
Herbert L. Brump
BY Henry G. Dybvig
His Attorney

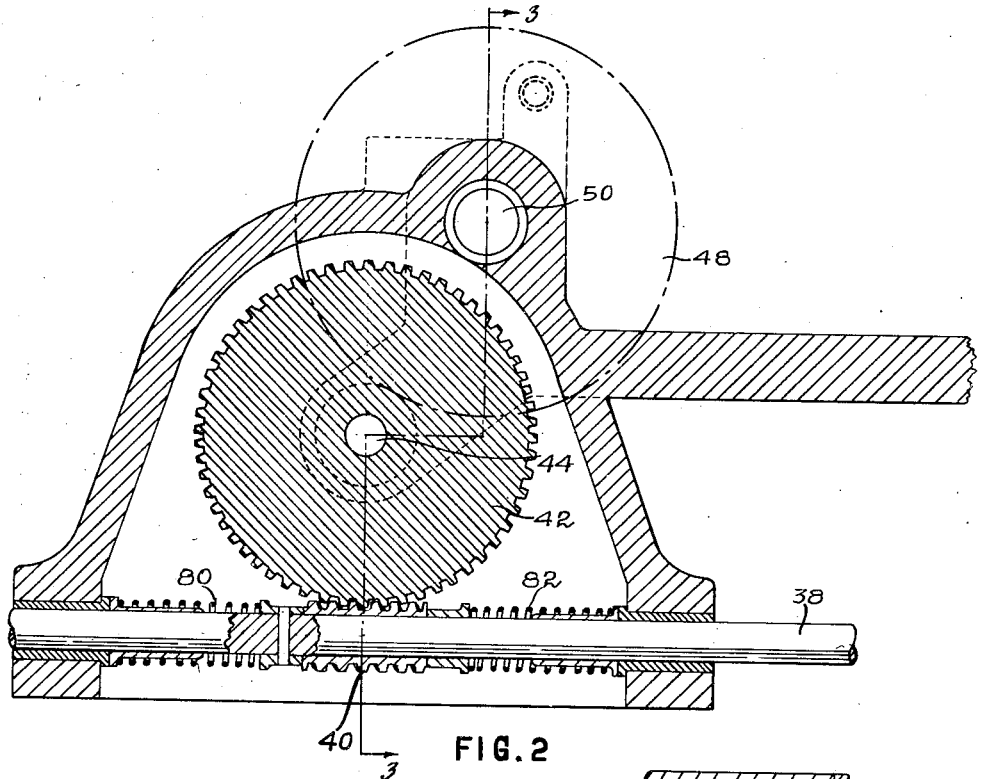
FIG.2
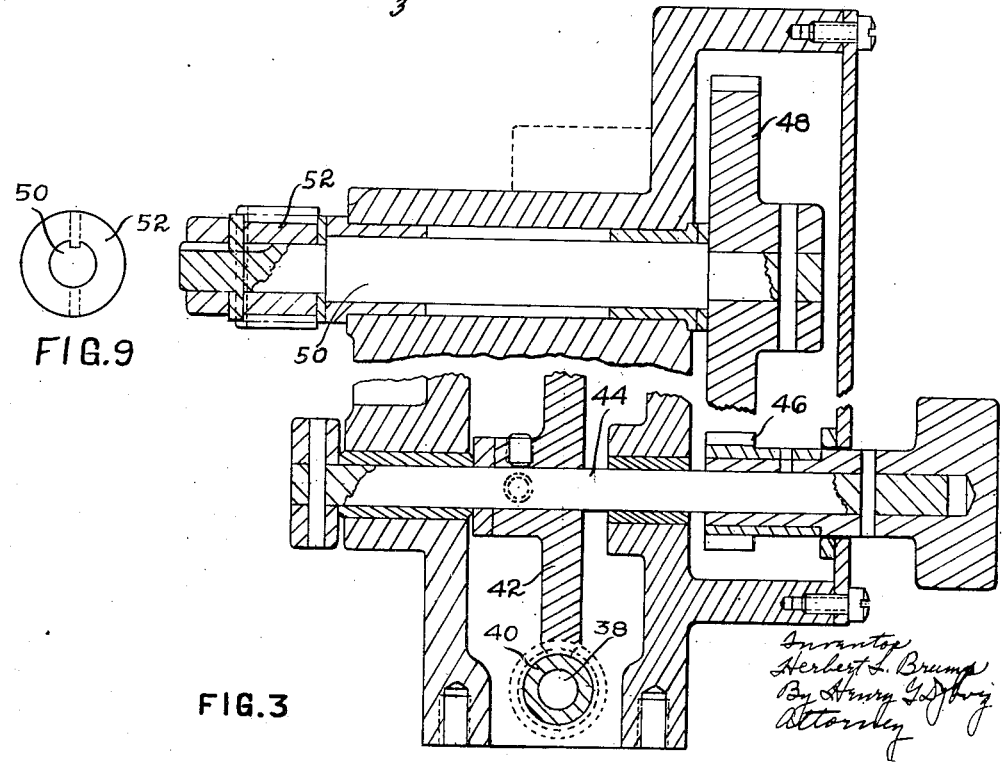
FIG.9
FIG.3

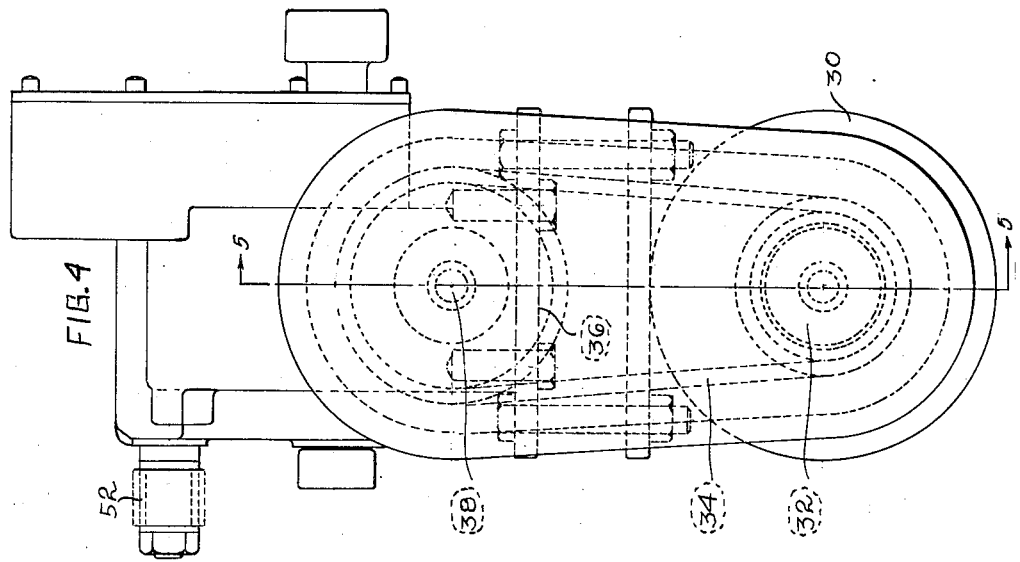
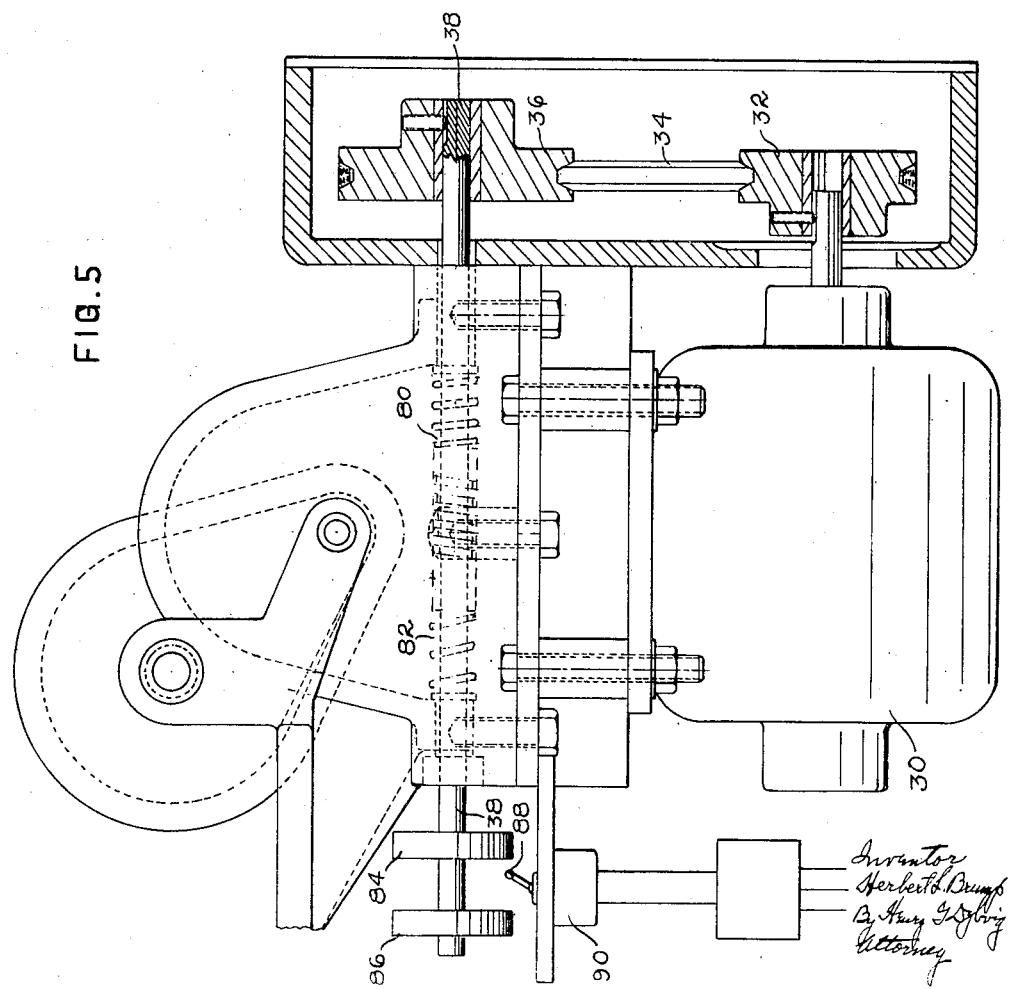

Patented Oct. 25, 1949

2,486,107

UNITED STATES PATENT OFFICE 2,486,107

REMOTE CONTROL FOR REVERSING RECIPROCATORY TABLE DRIVES

Herbert L. Brump, Dayton, Ohio, assignor to A. Ray Lambert, Dayton, Ohio, doing business under the firm name of Ohio Units Application August 22, 1944, Serial No. 550,618

10 Claims. (Cl. 74—27)

This invention relates to a control mechanism and more particularly to a control mechanism for controlling to and fro movements.

An object of this invention is to provide a reversing mechanism for reversing movements at predetermined intervals in response to a predetermined load condition by remote means.

Another object of this invention is to provide a resilient stop mechanism that is adjustably mounted with respect to reciprocatory strokes, which resilient stop mechanism throws an additional load upon the driving mechanism, which additional load is utilized in actuating the reversing mechanism.

Another object of this invention is to provide a worm gear drive wherein end thrust movements of the worm are resiliently resisted and may be overcome by a load overcoming the resilient mounting, which increased load is used in actuating a suitable switching mechanism reversing the movement of the prime mover.

Another object of this invention is to provide a reversing mechanism for a reciprocatory table or a reciprocatory tool, wherein a load is added to the device to be reversed, which load functions as a brake for the motor or prime mover, the energy absorbed by the increase in load being stored to aid the motor or prime mover in initiating movements in the reverse direction upon the reversal of the motor.

Other objects and advantages reside in the construction of parts, the combination thereof and the mode of operation, as will become more apparent from the following description.

In the drawings,

Figure 1 is a perspective view of a "superfinishing" machine provided with a reciprocatory table, the reciprocation of which table is remotely controlled.

Figure 2 is a fragmentary sectional view of a worm driving gear and the gear driven thereby.

Figure 3 is a cross sectional view taken substantially on the line 3—3 of Figure 2 with parts broken away.

Figure 4 is an end view of the motor and the reversing mechanism associated therewith.

Figure 5 is a fragmentary cross sectional view taken substantially on the line 5—5 of Figure 4.

Figure 6 is a cross sectional view taken substantially on the line 6—6 of Figure 8.

Figure 7 is a fragmentary cross sectional view of the stop block.

Figure 8 is a fragmentary cross sectional view taken substantially on the line 8—8 of Figure 6.

Figure 9 is an end view of a shaft and a collar keyed thereto.

Referring to the drawings, the reference character 10 indicates the base or frame supporting a reciprocatory table 12 having mounted for angular movement thereon a guide table 14 supporting a head stock 16 and a tail stock 18. The frame 10 supports a tool mounting standard 20 having mounted thereon a tool head 22 supporting a finishing tool 24 driven through a flexible shaft 26 from a motor, not shown. The device described thus far is primarily adapted for use as a superfinishing machine which has been shown merely for the purpose of illustration.

The reciprocatory table 12 reciprocates to and fro and is driven by a reversible motor 30 shown in Figure 5, actuating a pulley 32 driving a V-belt 34 engaging a pulley 36 mounted upon a worm gear drive shaft 38 supporting a worm 40, best seen in Figures 2 and 3, driving a worm gear 42 mounted upon a shaft 44 having keyed thereto a pinion 46 actuating a gear 48 mounted upon a shaft 50 having keyed thereto a pinion 52, actuating a rack, not shown, fixedly mounted underneath the reciprocatory table 12. As long as the motor 30 rotates in one direction, the table 12 continues to move in one direction.

In order to reverse the direction of movement of the table 12, it is necessary to reverse the direction of rotation of the motor 30. As is well known to those skilled in the art, a series motor may be reversed by reversing the direction of flow of current through the armature with respect to the field, or reversing the direction of flow of current through the field with respect to the armature. Several other types of motors may be reversed in a similar manner.

A remote control mechanism has been used for reversing the motor, which control mechanism utilizes the driving mechanism for actuating a switching mechanism for reversing the current through a portion of the motor in response to the part to be reversed resiliently engaging a stop mechanism, which will now be described in detail.

The frame 10 supports a block 60 provided with a pair of conical recesses 62, only one of which has been shown. Each conical recess is adapted to receive a tapered plunger 64. The tapered plungers 64 are resiliently mounted in blocks 66, adjustably attached to the side of the reciprocatory table 12. There are two of these blocks 66, one of which is used in reversing the motor at one end of the stroke of the table 12, the other for reversing the motor at the opposite end of the stroke, as will appear more fully later.

The length of the stroke of the table 12 may be adjusted by adjusting the blocks 66 away from each other or toward each other on the table 12 by suitable adjusting bolts 67. The position of the table with respect to the operating tool 24 may be adjusted by adjusting the blocks 66. If, for example, it is found desirable to have the reciprocatory table moved bodily towards the left, as viewed in Figure 1, the two blocks 66 may be adjusted towards the right, as viewed in this figure, so as to change the effective operating area of the tool with respect to the work. The detailed mechanism shown for the purpose of illustration for mounting the resiliently mounted plungers 64 includes an externally and internally threaded bushing 68 screw threaded into the block 66 and supporting a threaded sleeve 70 slidably supporting a spindle 72.

A compression spring 74 is mounted between a shoulder on the plunger 64 and an adjustably mounted collar 76, which collar is adjusted by sleeve 68. The sleeve 68 is shown near the inner position. Furthermore, the tension of the spring 74 may be tensioned by actuating the screw 70 threadedly engaging the bushing or sleeve 68. The head 78 of the spindle 79, integral with the plunger 64, engages the end of the tubular sleeve 70. When the plunger 64 engages the conical recess 62, the spring 74 is tensioned, thereby increasing the force required to actuate the table 12. The plunger 64 tends to arrest the movement of the table 12. This results in a heavy load being applied to the driving unit which is used in initiating the reversing movement.

The increased load or the braking effect of the spring 74 resisting movement of the plunger 64 is utilized in actuating a switching mechanism that reverses the direction of rotation of the motor 30. The worm 40, as may best be seen in Figure 2, is mounted between two helical springs 80 and 82. Thus, the shaft 38 keyed to the worm 40, may move to the right or to the left, as viewed in Figure 2, in the event the load on the worm 40 increases. As may be seen by referring to Figure 5, the left end of the shaft as shown in this figure has mounted thereon a pair of collars 84 and 86 straddling a switching element 88, used in actuating the toggle switch 90. In normal operation the direction of rotation of the shaft 38 is such that if the load increases, the worm 40 in screwing action compresses the spring 82, as viewed in Figure 2, so as to cause the collar 84 to engage the switching element 88 to reverse the polarity of the motor, thereby reversing the direction of rotation of the motor. The increased load on the motor has a tendency to slow up the motor. This is beneficial, in that the motor may be reversed without generating excessive arcing currents or arcing voltages, thereby preserving the switching contacts. Due to the fact that the spring 82 is under compression during reversal of the motor, the energy stored up in the springs 74 and 82 aids the motor in initiating the movement or accelerating the movement of the driven parts, thereby accomplishing the rapid acceleration of the moving parts in the reverse direction without unduly overloading the motor. When the table 12 approaches the end of the reverse position in the other direction, the spring 80 is subjected to compression. The collar 86 then engages the switching element 88 to restore the toggle switch to the position shown in Figure 6, again reversing the direction of the motor, so as to repeat the operation.

The V-pulley 36 is keyed to the shaft 38 and during the switching movement, the pulleys 32 and 36 are temporarily thrown out of alignment; but due to the fact that the V-belt is seated in the V-groove, this temporary misalignment has no deleterious effect, in that the upper end of the belt flexes to the side, as viewed in Figure 5. This flexing of the belt tensions the belt during the reversal of the motor, that is, the belt is tensioned as the load increases, thereby reducing the chances of slippage.

The device disclosed herein has been shown as applicable to driving a reciprocatory table. The device is equally as applicable to any other movement requiring a reversal, as for example, an oscillatory movement or a rotary movement, or any other periodic movement. In addition thereto, the device is applicable to reversing or arresting the movement of a motor in response to overload. For example, if the motor is used for driving a saw or driving an excavator or a hoist or any other type of a device where there may be a tendency to overload the motor, a worm could be used to actuate a switch to either stop the motor or reverse the direction of rotation of the motor. This reverse movement may be interrupted by any suitable method at any suitable position of the mechanism after a predetermined interval of time or in response to any selected contingency.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A work table reversing mechanism including a motor driving mechanism for translating rotary movement of the motor into linear movement actuating the work table, said driving mechanism including a worm gear meshing with a worm driven by the motor, yieldable means for maintaining the worm in axial alignment with the worm gear, said yieldable means permitting end thrust movement of the worm whenever the load increases, a switching mechanism for reversing the polarity of the motor, means responding to end thrust movement of the worm for actuating the switching mechanism to reverse the motor, and means for increasing the load on the worm gear when the work table approaches the end of its normal reciprocatory movement to thereby cause the switching mechanism to reverse the motor, said last mentioned means including a fixed stop having oppositely disposed conical recesses, a pair of blocks carried by the work table, each of said blocks supporting a plunger terminating in a conical portion, means for resiliently urging the plunger outwardly, said plunger being aligned with the recesses in the fixed stop so as to gradually increase the load.

2. A work table reversing mechanism including a motor driving mechanism for translating rotary movement of the motor into linear movement actuating the work table, said driving mechanism including a worm gear meshing with a worm driven by the motor, yieldable means for maintaining the worm in axial alignment with the worm gear, said yieldable means permitting end thrust movement of the worm whenever the load increases, a switching mechanism for reversing the polarity of the motor, means responding to end thrust movement of the worm gear for actuating the switching mechanism to reverse the motor, resilient means including a member mounted upon a work table, and a fixedly mounted member in the path of the member mounted upon the work table for increasing the load when the member on the work table engages the fixed member to thereby cause end thrust movement of the worm to actuate the switching mechanism to reverse the polarity of the motor.

3. A work table reversing mechanism including a motor driving mechanism for translating rotary movement of the motor into linear movement actuating the work table, said driving mechanism including a worm gear meshing with a worm driven by the motor, yieldable means for maintaining the worm in axial alignment with the worm gear, said yieldable means permitting end thrust movement of the worm whenever the load increases, a switching mechanism for reversing the polarity of the motor, means responding to end thrust movement of the worm gear for actuating the switching mechanism to reverse the motor, means for increasing the load near the end of the reciprocatory movement of the work table, and means fixedly attached in the path of the adjustable means mounted on the work table so that when the means on the work table engages the fixed means the load is increased to cause the end thrust movement of the worm actuating the switching mechanism to reverse the motor thereby reversing the direction of movement of the work table.

4. A work table reversing mechanism including a motor driving mechanism for translating rotary movement of the motor into linear movement actuating the work table, said driving mechanism including a worm gear meshing with a worm driven by the motor, yieldable means for maintaining the worm in axial alignment with the worm gear, said yieldable means permitting end thrust movement of the worm whenever the load increases, electric switching means for stopping and starting the motor, means responding to the end thrust movement of the worm gear for actuating the switching means to momentarily stop the motor, said switching means including mechanism for restarting the motor.

5. A work table reversing mechanism including a motor driving mechanism for translating rotary movement of the motor into linear movement actuating the work table, said driving mechanism including a worm gear meshing with a worm driven by the motor, yieldable means for maintaining the worm in axial alignment with the worm gear, said yieldable means permitting end thrust movement of the worm whenever the load increases, a switching mechanism for reversing the polarity of the motor, means responding to end thrust movement of the worm for actuating the switching mechanism to reverse the motor, and means for increasing the load on the worm gear when the work table approaches predetermined positions, said last mentioned means including a stationary stop member and a pair of adjustably mounted stop members on the work table, each of said adjustably mounted stop members including a resiliently mounted plunger aligned with the fixed stop member so that as the work table approaches one of the predetermined positions the plunger engages the stationary stop to increase the load to thereby reverse the motor.

6. A work table reversing mechanism including a motor driving mechanism for translating rotary movement of the motor into linear movement actuating the work table, said driving mechanism including a worm gear meshing with a worm driven by the motor, yieldable means for maintaining the worm in axial alignment with the worm gear, said yieldable means permitting end thrust movement of the worm whenever the load increases, a switching mechanism for reversing the polarity of the motor, means responding to end thrust movement of the worm for actuating the switching mechanism to reverse the motor, and means for increasing the load on the worm gear when the work table approaches predetermined positions, said last mentioned means including a fixedly mounted stop member mounted adjacent the path of movement of the work table, said stop member having a pair of oppositely disposed recesses, and a pair of yieldable stop members adjustably mounted on the work table, said pair of stop members being mounted for adjustment toward and away from each other to thereby change the length of the stroke of the work table, each of said adjustably mounted stop members including a resiliently mounted plunger actuated into registry with one of the recesses on the fixedly mounted stop member to increase the load.

7. A work table reversing mechanism including a motor, yieldable means driven by the motor for actuating the work table, switching mechanism for reversing the polarity of the motor in response to yielding movements of said yieldable means, and means for increasing the load on the yieldable means when the work table approaches predetermined positions, said last mentioned means including a stationary stop member and a pair of adjustably mounted stop members on the work table, each of said adjustably mounted stop members including a resiliently mounted plunger aligned with the fixed stop member so that as the work table approaches one of the predetermined positions, the plunger engages the stationary stop to increase the load to thereby reverse the motor.

8. A work table reversing mechanism including a motor, yieldable means driven by the motor for actuating the work table, switching mechanism for reversing the polarity of the motor in response to yielding movements of said yieldable means, and means for increasing the load on the yieldable means when the work table approaches predetermined positions, said last mentioned means including a fixedly mounted stop member mounted adjacent the path of movement of the work table, said stop member having a pair of oppositely disposed recesses and a pair of yieldable stop members adjustably mounted on the work table, said pair of stop members being mounted for adjustment toward and away from each other to thereby change the length of the stroke of the work table, each of said adjustably mounted stop members including a resiliently mounted plunger actuated into registry with one of the recesses on the fixedly mounted stop member to increase the load.

9. A work table reversing mechanism including a motor driving mechanism for translating rotary movement of the motor into linear movement actuating the work table, said driving mechanism including a worm gear meshing with a worm driven by the motor, yieldable means for maintaining the work in axial alignment with the worm gear, said yieldable means permitting end thrust movement of the worm whenever the load increases, said yieldable means including a shaft supporting the worm, said shaft being mounted for axial movement with said worm, a pair of spaced collars fixedly mounted near one end of the shaft, switching mechanism for reversing the motor, said switching mechanism including a switching element positioned between said collars for actuating said switching mechanism to reverse the motor, and means for increasing the load on the worm gear when the work table approaches predetermined positions, said last mentioned means including a stationary stop member and a pair of adjustably mounted stop members on the work table, each of said adjustably mounted stop members including a resiliently mounted plunger aligned with the fixed stop member so that as the work table approaches one of the predetermined positions the plunger engages the stationary stop to increase the load to thereby reverse the motor.

10. A work table reversing mechanism including a motor driving mechanism for translating rotary movement of the motor into linear movement actuating the work table, said driving mechanism including a worm gear meshing with a worm driven by the motor, yieldable means for maintaining the worm in axial alignment with the worm gear, said yieldable means permitting end thrust movement of the worm whenever the load increases, said yieldable means including a shaft supporting the worm, said shaft being mounted for axial movement with said worm, a pair of spaced collars fixedly mounted near one end of the shaft, a switching mechanism for reversing the polarity of the motor, said switching mechanism including a switching element positioned between said collars for actuating said switching mechanism to reverse the motor, and means for increasing the load on the worm gear when the work table approaches predetermined positions, said last mentioned means including a fixedly mounted stop member mounted adjacent the path of movement of the work table, said stop member having a pair of oppositely disposed recesses and a pair of yieldable stop members adjustably mounted on the work table, said pair of stop members being mounted for adjustment toward and away from each other to thereby change the length of the stroke of the work table, each of said adjustably mounted stop members including a resiliently mounted plunger actuated into registry with one of the recesses on the fixedly mounted stop member to increase the load.

HERBERT L. BRUMP.

REFERENCES CITED

The following references are of record in the file of this patent:

UNITED STATES PATENTS

| Number | Name | Date |
|---|---|---|
| 810,915 | Cowles | Jan. 30, 1906 |
| 1,744,228 | Kaufmann | Jan. 21, 1930 |
| 1,760,063 | Hynes | May 27, 1930 |
| 2,128,715 | Reich | Aug. 30, 1938 |
| 2,237,170 | Williamson | Apr. 1, 1941 |
| 2,239,639 | Amidon | Apr. 22, 1941 |
| 2,253,170 | Dunham | Aug. 19, 1941 |
| 2,317,490 | Simpson | Apr. 27, 1943 |

FOREIGN PATENTS

| Number | Country | Date |
|---|---|---|
| 572,040 | Germany | Mar. 9, 1933 |